(12) United States Patent
Carrington

(10) Patent No.: US 10,885,597 B1
(45) Date of Patent: ***Jan. 5, 2021

(54) METHOD AND SYSTEM FOR RETRIEVING AND SERVING REGULATORY HISTORY FOR A PROPERTY

(71) Applicant: Unearthed Land Technologies, LLC, Maitland, FL (US)

(72) Inventor: Charles C. Carrington, Cocoa, FL (US)

( * ) Notice: Subject to any disclaimer, the term of this patent is extended or adjusted under 35 U.S.C. 154(b) by 212 days.

This patent is subject to a terminal disclaimer.

(21) Appl. No.: 16/208,097

(22) Filed: Dec. 3, 2018

Related U.S. Application Data

(63) Continuation of application No. 15/659,333, filed on Jul. 25, 2017, now Pat. No. 10,147,150, which is a continuation of application No. 15/390,027, filed on Dec. 23, 2016, now Pat. No. 9,786,021, which is a continuation of application No. 15/006,856, filed on Jan. 26, 2016, now Pat. No. 9,563,642, which is a continuation of application No. 14/079,217, filed on Nov. 13, 2013, now Pat. No. 9,275,357, which is a continuation of application No. 13/606,656, filed on Sep. 7, 2012, now Pat. No. 8,606,747, which is a continuation of application No. 12/434,489, filed on May 1, 2009, now Pat. No. 8,271,431, which is a continuation-in-part of application No. 12/419,112, filed on Apr. 6, 2009, now abandoned, and a continuation-in-part of application No. 12/252,413, (Continued)

(51) Int. Cl.
  *G06F 7/00* (2006.01)
  *G06Q 50/16* (2012.01)
  *G06F 16/2457* (2019.01)

(52) U.S. Cl.
  CPC ..... *G06Q 50/163* (2013.01); *G06F 16/24573* (2019.01)

(58) Field of Classification Search
  CPC ............ G06F 16/24573; G06F 16/248; G06F 16/2452; G06Q 50/163
  USPC ........................................ 707/603, 693, 707
  See application file for complete search history.

(56) References Cited

U.S. PATENT DOCUMENTS

| | | |
|---|---|---|
| 5,193,185 A | 3/1993 | Lanter |
| 5,680,305 A | 10/1997 | Apgar, IV |

(Continued)

OTHER PUBLICATIONS

Carrington, U.S. Appl. No. 11/073,578, filed Mar. 8, 2005.

(Continued)

*Primary Examiner* — Md I Uddin
(74) *Attorney, Agent, or Firm* — K&L Gates LLP

(57) ABSTRACT

Described are methods and systems for retrieving and serving the regulatory history of a property. For example, an identification of data sources for permits and approvals is stored in a computer system. Property identifiers from the data sources are stored in the computer system. The system identifies the types of permit and approval data available from each of the data sources for each of the property identifiers. A determination can be made of the completeness of the regulatory history available for each property associated with each of said property identifiers. The system receives a request for the regulatory history of at least one of the properties associated with the property identifiers. A web page may be populated with a list of the regulatory history for the property.

30 Claims, 3 Drawing Sheets

Related U.S. Application Data filed on Oct. 16, 2008, now abandoned, and a continuation-in-part of application No. 11/945,988, filed on Nov. 27, 2007, now abandoned, and a continuation-in-part of application No. 11/073,578, filed on Mar. 8, 2005, now abandoned.

(56) References Cited

U.S. PATENT DOCUMENTS

| | | | |
|---|---|---|---|
| 5,835,236 | A | 11/1998 | Barbari |
| 6,038,668 | A | 3/2000 | Chipman et al. |
| 6,067,533 | A | 5/2000 | McCauley et al. |
| 6,148,289 | A | 11/2000 | Virdy |
| 6,519,618 | B1 | 2/2003 | Snyder |
| 6,522,875 | B1 | 2/2003 | Dowling et al. |
| 6,636,803 | B1 | 10/2003 | Hartz, et al. |
| 6,766,322 | B1 | 7/2004 | Bell |
| 6,850,902 | B1 | 2/2005 | Finch |
| 7,457,628 | B2 | 11/2008 | Blumberg et al. |
| 7,734,606 | B2 | 6/2010 | Walker |
| 7,802,283 | B2 | 9/2010 | Banker |
| 7,949,589 | B2 | 5/2011 | Halpin |
| 8,271,431 | B1 | 9/2012 | Carrington |
| 8,606,747 | B2 | 12/2013 | Carrington |
| 9,275,357 | B2 | 3/2016 | Carrington |
| 2001/0039506 | A1 | 11/2001 | Robbins |
| 2002/0010572 | A1 | 1/2002 | Orton et al. |
| 2002/0013746 | A1 | 1/2002 | Bibas et al. |
| 2002/0032643 | A1 | 3/2002 | Himmelstein |
| 2002/0052814 | A1 | 5/2002 | Ketterer |
| 2002/0065739 | A1 | 5/2002 | Florance et al. |
| 2002/0103669 | A1 | 8/2002 | Sullivan et al. |
| 2002/0174090 | A1 | 11/2002 | Dexter |
| 2003/0014342 | A1 | 1/2003 | Vande Pol |
| 2003/0036922 | A1 | 2/2003 | Fries |
| 2003/0078897 | A1 | 4/2003 | Florance et al. |
| 2003/0101072 | A1 | 5/2003 | Dick et al. |
| 2003/0131011 | A1 | 7/2003 | Haunschild et al. |
| 2003/0140064 | A1 | 7/2003 | Klein |
| 2003/0177111 | A1 | 9/2003 | Egendorf et al. |
| 2003/0187756 | A1 | 10/2003 | Klivington et al. |
| 2003/0220805 | A1 | 11/2003 | Hoffman et al. |
| 2003/0220807 | A1 | 11/2003 | Hoffman et al. |
| 2003/0229649 | A1 | 12/2003 | Herrero |
| 2004/0039581 | A1 | 2/2004 | Wheeler |
| 2004/0049440 | A1 | 3/2004 | Shinoda et al. |
| 2004/0059653 | A1 | 3/2004 | Verkuylen et al. |
| 2004/0098283 | A1 | 5/2004 | Shea |
| 2004/0117358 | A1 | 6/2004 | von Kaenel et al. |
| 2004/0128313 | A1 | 7/2004 | Whyman |
| 2004/0181473 | A1 | 9/2004 | Duke |
| 2004/0220885 | A1 | 11/2004 | Salzmann et al. |
| 2005/0010423 | A1 | 1/2005 | Bagbey et al. |
| 2005/0055233 | A1 | 3/2005 | Wenzlau et al. |
| 2005/0071376 | A1 | 3/2005 | Modi |
| 2005/0091097 | A1 | 4/2005 | De Sousa |
| 2005/0203768 | A1 | 9/2005 | Florance et al. |
| 2005/0209867 | A1 | 9/2005 | Diesch et al. |
| 2005/0209873 | A1 | 9/2005 | Anastasi |
| 2005/0210068 | A1 | 9/2005 | Szymanski et al. |
| 2005/0256827 | A1 | 11/2005 | Levanoni et al. |
| 2005/0262016 | A1 | 11/2005 | Hill et al. |
| 2005/0273346 | A1* | 12/2005 | Frost ............... G06Q 50/167 |
| | | | 705/316 |
| 2005/0288955 | A1 | 12/2005 | Lewiss-Hachmeister |
| 2005/0288957 | A1 | 12/2005 | Eraker |
| 2006/0010005 | A1 | 1/2006 | Rowland |
| 2006/0020518 | A1 | 1/2006 | Lovison et al. |
| 2006/0020541 | A1 | 1/2006 | Gommlich |
| 2006/0026136 | A1 | 2/2006 | Drucker et al. |
| 2006/0064375 | A1 | 3/2006 | Campagna et al. |
| 2006/0111945 | A1 | 5/2006 | Tinsley et al. |
| 2006/0116952 | A1 | 6/2006 | Orfano |
| 2006/0155559 | A1 | 7/2006 | Richardson |
| 2006/0155571 | A1 | 7/2006 | Almeida et al. |
| 2006/0200492 | A1* | 9/2006 | Villena ............... G06Q 30/08 |
| 2006/0253293 | A1 | 11/2006 | Osborn |
| 2006/0294002 | A1 | 12/2006 | Brett |
| 2007/0203730 | A1 | 8/2007 | Firl et al. |
| 2007/0219818 | A1 | 9/2007 | Duthler et al. |
| 2007/0255625 | A1 | 11/2007 | Katzen |
| 2008/0059220 | A1 | 3/2008 | Roth et al. |
| 2008/0082344 | A1 | 4/2008 | Parker |
| 2008/0120243 | A1 | 5/2008 | Lakin |
| 2008/0154686 | A1 | 6/2008 | Vicino |
| 2008/0167883 | A1 | 7/2008 | Khazaneh |
| 2008/0201209 | A1 | 8/2008 | Grotto |
| 2008/0208707 | A1 | 8/2008 | Erbey et al. |
| 2008/0222014 | A1 | 9/2008 | Thompson et al. |
| 2008/0255871 | A1 | 10/2008 | Wenzlau et al. |
| 2008/0281649 | A1 | 11/2008 | Morris |
| 2008/0288336 | A1 | 11/2008 | Charuk et al. |
| 2008/0306982 | A1 | 12/2008 | Moudy |
| 2009/0077100 | A1 | 3/2009 | Hancock et al. |
| 2009/0099954 | A1 | 4/2009 | Kilby |
| 2009/0100031 | A1 | 4/2009 | Gilligan et al. |
| 2010/0153151 | A1 | 6/2010 | Toenjes |
| 2013/0185172 | A1 | 7/2013 | Mullaly |

OTHER PUBLICATIONS

Carrington, U.S. Appl. No. 12/419,112, filed Apr. 6, 2009.
Carrington, U.S. Appl. No. 12/388,260, filed Feb. 18, 2009.
Carrington, U.S. Appl. No. 12/419,769, filed Apr. 7, 2009.
Carrington, U.S. Appl. No. 11/945,988, filed Nov. 27, 2007.
Carrington, U.S. Appl. No. 12/252,413, filed Oct. 16, 2008.
Carrington, U.S. Appl. No. 12/419,105, filed Apr. 6, 2009.
Carrington, U.S. Appl. No. 12/419,118, filed Apr. 6, 2009.
Carrington, U.S. Appl. No. 12/419,132, filed Apr. 6, 2009.
Carrington, U.S. Appl. No. 12/419,147, filed Apr. 6, 2009.
Carrington, U.S. Appl. No. 12/419,155, filed Apr. 6, 2009.
Carrington, U.S. Appl. No. 12/434,482, filed May 1, 2009.
Carrington, U.S. Appl. No. 12/266,340, filed Nov. 6, 2008.
Wood River ("Building and Zoning Department." Nov. 8, 2005). http://woodriver.org/Services/BuildingandZoning/Overview.htm.
*Rhod-A-Zalea & 35th, Inc. v. Snohomish County*, 959 P.2d 1024, 1032 (1998).
Ted Norwell, "RealtyTrac Launches Website with Data on Distressed Properties," National Mortgage News, Aug. 7, 2000, http://www.highbeam.com/doc/1G1-63918985.htm.
Morgan M. Robertson, The neoliberalization of ecosystem services: wetland mitigation banking and problems in environmental governance, Geoforum, vol. 35, Issue 3, Themed issue on 'Neoliberal nature and the nature of neoliberalism', May 2004, pp. 361-373, ISSN 0016-7185, DOI: 10.1016/j.geoforum.2003.06.002. (http://www.sciencedirect.com).
Boyer, Tracy Ann (2003). The wetland mitigation banking credit market in Minnesota: A spatial economic analysis of its potential to achieve regulatory and ecological goals. Ph.D. dissertation, University of Minnesota, United States—Minnesota. (hereinafter Boyer).
Eric Fetters (Mar. 1, 2004), Banking on a concept that's all wet: Wetland preservation is the core mission of Habitat Bank LLC, The Herald.
Casey Buckro, Tribune Staff Writer (Aug. 25, 1999), Wetlands Banking is Big Business Swamp Land at $60,000 an Acre? Developoers are Buing to Keep on Building: [Lake Edition]. Chicago Tribune, p. 1.

* cited by examiner

METHOD AND SYSTEM FOR RETRIEVING AND SERVING REGULATORY HISTORY FOR A PROPERTY

This application is a continuation of U.S. patent application Ser. No. 15/659,333, filed on Jul. 25, 2017, which is a continuation of Ser. No. 15/390,027, filed Dec. 23, 2016, a continuation of U.S. patent application Ser. No. 15/006,856, filed Jan. 26, 2016, which is a continuation of Ser. No. 14/079,217, filed Nov. 13, 2013, which is a continuation of U.S. patent application Ser. No. 13/606,656, filed Sep. 7, 2012, which is a continuation of U.S. patent application Ser. No. 12/434,489, filed May 1, 2009, which is a continuation-in-part of U.S. patent application Ser. No. 12/419,112 filed Apr. 6, 2009, and is a continuation-in-part of U.S. patent application Ser. No. 12/252,413, filed Oct. 16, 2008, and is a continuation-in-part of U.S. patent application Ser. No. 11/945,988 filed Nov. 27, 2007, and is a continuation-in-part of U.S. patent application Ser. No. 11/073,578 filed Mar. 8, 2005, the entire disclosures of each of which are hereby incorporated by reference herein.

BACKGROUND OF THE RELATED ART

The regulatory history of a parcel of real property consists of past, present and future permits and approvals. Such future permits and approvals may be, e.g., permits and approvals necessitated or contemplated by new, proposed or anticipated legislation, regulations, laws, or other rules. Historically, governmental authorities provide citizens, corporations and other types of entities, non-governmental organizations and other governmental authorities access to the regulatory history of a parcel of real property via paper files.

Certain governmental authorities provide electronic access to portions of the regulatory history of property within the authority's jurisdiction. For example, in Florida, each county's property appraiser provides content to a county-specific database on which certain records connected with properties within the county are made available to the public.

In connection with real estate transactions, financing and development, parties perform regulatory due diligence which requires assembling the complete regulatory history of a property. Regulatory due diligence is typically performed by lawyers, engineers, land planners or other professionals. Liability considerations usually preclude assigning this work to assistants and clerical level personnel. The permits will certainly be reviewed by a professional and will be the subject of a final legal opinion or report. Overlooking a particular Permit or Approval could easily lead to an inaccurate and/or incomplete report and ultimately giving the wrong advice.

Currently, one has to travel the offices of each of the applicable governmental authorities and in many cases, such as a local government, the various departments thereof such as the planning, zoning, building, public works, environmental resources and other departments. (Other governmental authorities are subdivided into bureaus, sections, districts and the like.) At the reception desk for each, one has to request the file for the particular property and provide the particular means of identifying that particular property used by that governmental authority or department thereof Sometimes it is necessary to wait for the first available staff member to assist you. Other times you are pointed in the direction of banks of filing cabinets and left to locate the desired file on your own. The governmental authority or department may have a system for organizing the files that is either unfamiliar or altogether a poor system. Files may be disorganized, misplaced or inexplicably missing. Missing files may be checked out to or in use without any tracking or other record by a staff member of the governmental authority or department thereof and must be located. Once the file (or more likely files) is located, it (they) must be reviewed for the desired permits and approvals. Items to be copied which are usually voluminous and often include plans, drawings or maps must be tabbed in some manner for copying by the first available clerical level employee of the governmental authority or department. Once copied, the governmental authority or department thereof collects for the copies. The process is repeated at the next governmental authority or department. Some governmental authorities or departments accept requests for copies of permits and approvals by letter and will process the request on an hourly rate basis, plus copy charges and shipping. Such governmental authorities have already or are in the process of scanning such paper files to convert them to a digital image that can be accessed electronically on the website of such governmental authority or department thereof by inputting the means of identifying such parcel of real property utilized by that particular governmental authority.

SUMMARY

According to one embodiment, a method and system for retrieving and serving the regulatory history of a property are provided. An identification of data sources for permits and approvals is stored in a computer system. Property identifiers from the data sources are stored in the computer system. The system identifies the types of permit and approval data available from each of the data sources for each of the property identifiers. A determination is made of the completeness of the regulatory history available for each property associated with each of said property identifiers. The system receives a request for the regulatory history of at least one of the properties associated with the property identifiers. A web page is populated with a list of the regulatory history for the property.

In another embodiment, the system provides a data layering feature by which the computer layers the maps or other data, e.g., GIS data, of each of the respective governmental authorities. Utilizing the software, the computer automatically searches the particular means of identifying the property that has been input by the user. In another embodiment, utilizing the software, the computer recognizes the form of the means of identifying the property that has been input by the user and automatically retrieves data from the website or data source of the governmental authority with the corresponding form before searching the websites or data sources of the other governmental authorities. A match is found at, e.g., the website or data source of one of the applicable governmental authorities, and this match is used to identify the property. The data layering feature of the system enables the computer to automatically perform a layering of the maps or other data, e.g., GIS data, of other governmental authorities with the map or other data, e.g., GIS data, of such governmental authority identifying the particular property, resulting in the positive identification of the particular property for purposes of the websites or data sources of the other governmental authorities without regard to the means of identifying a particular property utilized by a particular governmental authority.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of at least one embodiment of the disclosure.

In the drawings.

DETAILED DESCRIPTION

Figure 1:
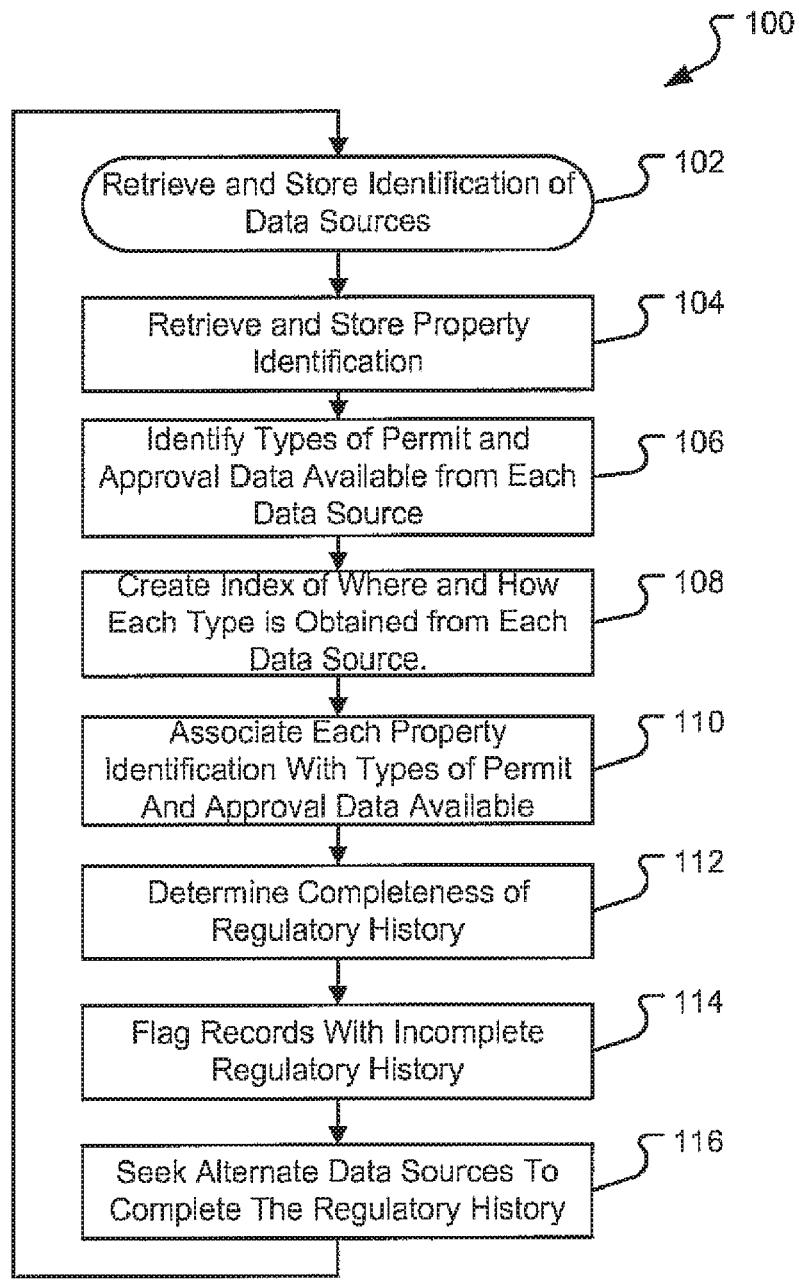
FIG. 1 shows a flowchart illustrating one embodiment of a method for operating a web crawler.

Reference will now be made in detail to embodiments of the present disclosure, examples of which are illustrated in the accompanying drawings.

In one embodiment, the present disclosure provides a method and system for retrieving and serving regulatory history for a property, which may include different particular types of information from various data sources. In certain embodiments, the present disclosure includes a step of storing the regulatory history. The regulatory history for a property includes past, present and future actions of federal, state, regional, agency, local and other governmental authorities and departments, districts, bureaus or other subdivisions thereof relating to activities involving commercial and residential real estate and improvements thereon, such as ownership, sale, purchase, transfer, exchange, leasing, financing, development, change in intensity of use or density, management, maintenance, permitting, assemblage, subdivision, redevelopment, clearing, filling, expansion, construction, reconstruction, building, remodeling, alteration, tenant finish, demolition, rehabilitation, drilling, mining, excavation, deposit (refuse, solid or liquid waste or fill), conservation, mitigation, protection, remediation, landscaping, alteration of a shore or bank (of a seacoast, river, stream, lake, pond or canal), waterscaping, architecture, design, planning, engineering and legal and all other manner of permits and approvals pertaining to the property, including permits, approvals, waivers, exceptions, exemptions, findings, determinations, hearings, or other official action(s) by any such governmental authority or subdivision thereof in connection with any of the foregoing activities, building permits, zoning permits, plat approvals, subdivision approvals, rezonings, comprehensive plans amendments, certifications, special exceptions, variances, development orders (granting, denying or granting with conditions an application for any of the foregoing), and any of the foregoing pertaining to concurrency, consistency, development of regional impact, future land use map amendments, comprehensive plan amendments, annexation, or sector planning. Examples of different particular types of information or data, from various data sources, may include information relating to any of the following: location, governing jurisdiction, tax parcel number, planning area, sector planning area, overlay zone or district, zoning (current, proposed, overlay district, permitted uses, special exceptions, conditional use approvals, allowable density, allowable intensity, planned unit development, non-conforming uses, etc.), master plan, site plan, land use classification, future land use classification, comprehensive plan status (consistency, etc.), impact fees, adequate public facilities requirements, concurrency, impacts to public facilities and/or services, proffers, acreage (gross, net developable, achievable density, etc.), access (paved dedicated public right-of-way, private, programmed road improvements, applicable developer's agreements), potable water (availability and adequacy, nearest water line, distance, sizing, current/proposed capacity of water plant, etc.), sewer (availability and adequacy, location of nearest sewer line, distance, sizing, current/proposed capacity of sewage plant, etc.), existing easements (easements appurtenant, easements in gross, proposed easements/rights-of-way for proposed utilities and/or roadways, etc.), utilities (power plants, availability at the site of natural gas, electric power, telephone, high-speed internet, etc.), floodplain or flooding (FEMA maps, coastal construction control line, etc.), resource protection areas (RPA maps, etc.), soils and other geotechnical data (soil book, water table, etc.), market analysis (rooftops within specified distance, competing uses within specified distance, comparables, absorption rates, square footage, price per square foot, etc.), feasibility data, location/site prominence or visibility (status of surrounding properties, etc.), historic and/or archaeological sites or considerations, traffic data (level of service, vehicle counts, signalization, proposed widenings, programmed improvements, etc.), topographic information (aerials, maps, historic data, etc.), vegetative information (wetland species, upland species, wetlands determinations, etc.), wetlands, uplands, conservation areas, threatened and endangered species (environmental permitting considerations, etc.), environmental contamination from hazardous waste or materials for Phase 1 or Phase 2 environmental audit, title examination, title record (covenants and restrictions, easements, mortgages, liens, encumbrances and other matters of records, recorded plat, etc.), brownfields, remediation for environmental contamination (fuel storage tanks, status of clean-up, etc.), building code violations and/or code enforcement actions and similar matters, mineral rights, mineral leases, existing or proposed building and/or development regulations (setbacks, open space requirements, parking, floor area ratio, impervious surface ratio, height, etc.), ceilings, floors, airports, rail (light rail and other transit systems), military training facilities, roads (property configuration and frontage on abutting roads), riparian rights, mean high water determination (data pertaining to waterfront properties, etc.), property taxes (assessed values, millage rates, proposed tax increases, status of payment of property taxes, etc.), condemnation, eminent domain, marina data (caps on wet slips, dry slips, etc.).

Users of the system include owners, developers, buyers, sellers, landlords, tenants, brokers, realtors, law firms, land planning firms, engineering firms, environmental permitting firms, brokerage firms (sales and leasing), surveying firms, appraisal firms, real estate management firms, federal, state and local governmental authorities, as well as others having an interest in or otherwise dealing with real estate and related matters.

The system obtains and provides to the user for their review and analysis permits and approvals of federal, state, regional, agency, local and other governmental authorities relating to activities involving commercial and residential real estate such as ownership, sale, purchase, transfer, exchange, leasing, financing, development, management, maintenance, permitting, assemblage, redevelopment, expansion, construction, reconstruction, remodeling, tenant finish, demolition, rehabilitation, conservation, mitigation, protection, remediation, landscaping, waterscaping, architecture, design, planning, engineering and legal.

The method utilizes data available through the internet to access a complete regulatory history of permits and approvals for a particular property from websites or other data sources of governmental authorities or similar sources, such as local government websites, land records offices, zoning departments, planning departments, building departments, public works departments, engineering departments, environmental resources departments, property appraisers' websites, clerks office websites, records retention websites, public library/recordkeeping websites, zoning/land development regulation websites, and the like. A web crawler can be used to automatically populate a database of available permits and approvals for particular properties.

FIG. 1 shows a method 100 for operation of a web crawler in accordance with certain embodiments. The steps shown may be iteratively repeated on a regular basis, such as each night or continuously. At step 102, the URLs of websites that are known to contain permit or approval data are stored in a local database. As an alternative to URLs, other identifiers sufficient to determine the network location of the data sources may be stored. The web crawler may be programmed to use keyword searches to automatically search the internet for appropriate data sources and retrieve the identifiers, with or without human intervention. The data identifying relevant data sources may also be input as a file containing, for example, comma separated values, or in XML format. The data identifying relevant data sources is stored in a local database, which may reside on the same physical computer as the web crawler software or on a separate computer.

At step 104, property identifiers are stored in the local database. The property identifiers comprise data sufficient to uniquely identify one or more properties about which permit and approval data are available from one or more of the data sources. The property identifiers may include tax parcel numbers, metes and bounds legal descriptions, section land legal descriptions, GPS coordinates, property addresses, subdivision plat description, State, City, County, Street Address, Lot Number, permit number or date, approval number or date, other significant date, or others. The property identifiers may be automatically retrieved from the data sources identified in step 102 by the web crawler. Alternatively, the property identifiers may be input as a file containing, for example, comma separated values, or in XML format.

At step 106, the web crawler identifies the types of permit and approval data available for the identified properties from each identified data source. Permit and approval types include, e.g., permit, approval, waiver, exception, exemption, building permit, zoning permit, platt approval, subdivision approval, rezoning, certification, special exception, variance, development order. Human intervention may be used along with the web crawler to classify permit and approval data available from a particular data source into a particular type. The types of permit approval data available from a particular data source are stored in the local database.

At step 108, the data types identified at step 106 are used to create an index of where and how each data type can be found on each data source.

At step 110, the types of permit and approval data available for a particular property from the various data sources are associated in the local database with the property identifier for the property.

At step 112 a determination of the completeness of the regulatory history that is available from all data sources for a particular property is determined. In this step, the system can apply business rules to determine whether a complete regulatory history, sufficient to rely upon for purposes of due diligence, is available to the system for each property. Such business rules include, e.g., whether regulatory history was found at a particular governmental authority where pertinent regulatory history would be expected to be found for the property of interest. At step 114, records for individual properties for which the regulatory history is incomplete are flagged in the local database.

At step 116, the system seeks alternate data sources to complete the regulatory history. As with the initial step of retrieving and storing an identification of data sources at step 102, step 116 may be automated or involve manual input of the identification of alternate data sources.

Figure 2:
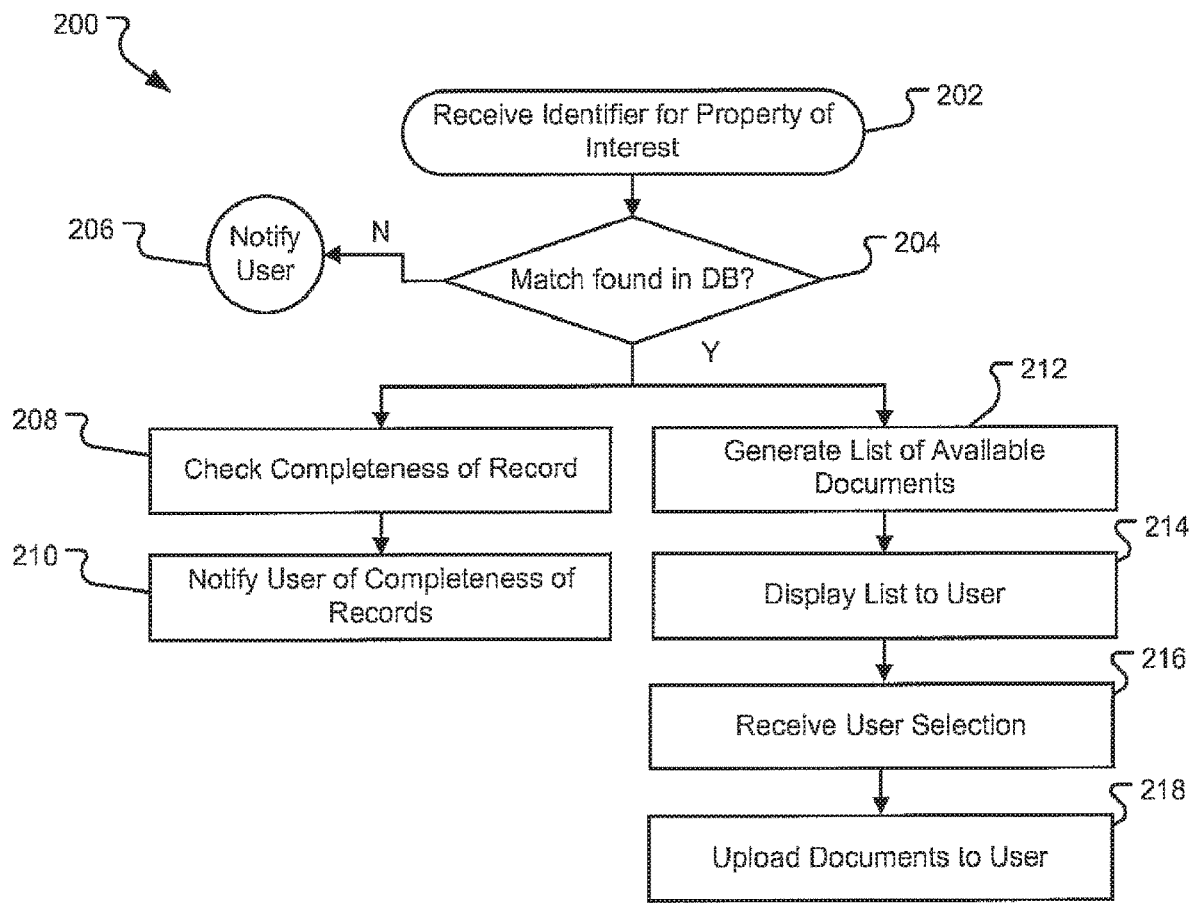
FIG. 2 shows a flowchart illustrating one embodiment of a method for receiving and serving requests from users.

FIG. 2 illustrates a method 200 by which the system assists a user in conducting regulatory due diligence once the web crawler has retrieved and stored data in accordance with FIG. 1. At step 202, the system receives from the user an identifier for a property of interest. The system may receive the information via a web interface to the user, by direct input of the identifier into the system by the user or others, via a private network, via the internet, or other known communication medium The identifier received from the user may be, e.g., one or more of: a tax parcel number, a metes and bounds legal description, a section land legal description, GPS coordinates, a property address, a subdivision plat description, a State, a City, a County, a Street Address, a Lot Number, or others. In an alternative embodiment, the system may receive all property identifiers for a particular property of interest.

At step 204, the system uses the identifier received from the user to identify one or more records in its local database for the specified property. As an alternative to consulting the local database, the system may go out to the data source and, using the identifier input by the user, retrieve property matches or possible matches, or additional property identifiers. The matching step 204 is preferably automatic, but could be performed manually. If a match is not found, the user is so notified at step 206. If multiple possible matches are found, the user may be prompted at this step to disambiguate between the matches. If a potential match is found, the user can be prompted to confirm the match. If below a certain predetermined threshold, the system would determine that there is a match. Otherwise, the system may alert the proprietor of the system to manually determine a match.

In layering maps or similar data from the governmental authorities, discrepancies may result in how the property is described by one governmental authority to the next arising from governmental authorities utilizing differing means to describe real property. The system may resolve any uncertainty in its matching process automatically as follows. The system using existing standard GIS techniques determines any discrepancies between how the property is described from one governmental authority to the next, reconciles and thereby determines a match. This process may also be utilized with the data layering feature described below. In another embodiment, the system includes software code for displaying a map showing states, counties, cities, and similar types of jurisdictional limits of governmental authorities of all types. In such embodiments, the system automatically performs an operation to determine the appropriate governmental authority for various purposes. For example, this operation would facilitate the identification of the appropriate governmental authority with jurisdiction over property taxes and the appropriate governmental authority with jurisdiction over permitting, which may be the same or different jurisdiction.

If step 204 results in a match being found in the local database, the completeness of the available records, which was determined previously at step 112 (FIG. 1), is checked and the user is notified of same at step 210.

At step 212, a list of available documents is generated. This step can be performed either online with the sources of available information or offline by referring to the local database. In online embodiments, the system uses the index created at step 101 (FIG. 1) to communicate with each of the sources of available "information for the identified property and obtain from them lists of available documents for the property. Alternatively, in an offline embodiment, the system can refer to its local database to compile the list of all available documents for the property. At step 214, the list is displayed to the user.

At step 216, the system receives the user's selection of one or more documents to download. This selection may be a selection of all documents in the regulatory history of the property of interest. At step 218, the selected documents are uploaded to the user. In certain embodiments of the system, this step or previous steps will involve obtaining authorization from the user to charge a user's account or credit card for a fee for use of the system.

In certain embodiments, the system provides a data layering feature by which the computer automatically layers the maps or other data, e.g., GIS data, of each of the respective governmental authorities. Utilizing the software, the computer automatically searches the particular means of identifying the property that has been input by the user, such as a tax parcel number, metes and bounds legal description, section land legal description, GIS data, property address, subdivision plat description, GPS data, spatial data sets, spatial coordinates, unique I.D., centroid, cadastre, tabular data, attributes, non-spatial data, georeference data. etc., at each of the websites or data sources for the various governmental authorities until a match is found. In another embodiment, utilizing the software, the computer recognizes the form of the means of identifying the property that has been input by the user and automatically retrieves data from the website or data source of the governmental authority with the corresponding form before searching the websites or data sources of the other governmental authorities. For example, if the user inputted the tax parcel number for the particular property, utilizing the software, the computer would automatically run searches at the various governmental authorities for a match. In accordance with this example, a match is found at the applicable property appraiser's website. Utilizing the software, this match is used to identify the property. The data layering feature of the software enables the computer to automatically perform a layering of the maps or other data, e.g., GIS data, of other governmental authorities with the property appraiser's map or other data, e.g., GIS data, identifying the particular property resulting in the positive identification of the particular property for purposes of the websites or data sources of the other governmental authorities without regard to the means of identifying a particular property utilized by a particular governmental authority.

In one embodiment, utilizing the software, the computer retrieves and stores the particular means of identifying a property utilized by each governmental authority for later use in performing other operations. Having identified the particular property on each of the websites for each of the governmental authorities, the computer, utilizing the web crawler component of the present disclosure, automatically performs searches of the websites of the various governmental authorities for the permits and approvals, as previously defined. Therefore, utilizing the means of identifying a particular property employed by any one of the applicable governmental authorities, the data layering feature of the software would automatically identify a particular property at the websites of all of the governmental authorities.

In one embodiment, utilizing the software, the computer searches for and retrieve all permits and approvals for a particular property utilizing the method above. In another embodiment, utilizing the software, the computer performs only such part of the foregoing operations as may be necessary to execute a custom search ordered by a user. For example, a user desiring only a particular approval of one governmental authority would place an order providing the one or more means of identifying the particular property at his disposal and inputting as a custom search the name of the particular permit or permits desired to be obtained. In another embodiment, utilizing the software and a user interface feature a user under a custom search would view the layering of the maps or similar data and utilizing certain commands move from the web site of one governmental authority to that of another governmental authority to scan for and select desired permits and approvals and related information.

The system can be configured such that volume users have an established account or other contractual relationship with the proprietor of the system. Volume users may be offered volume discounts. Other prospective users will go inline to a web site associated with the system and complete a single transaction from time to time. Transactions may be priced on a flat fee basis, time to execute the transaction, kilobytes of data retrieved or similar bases of compensation.

Figure 3:
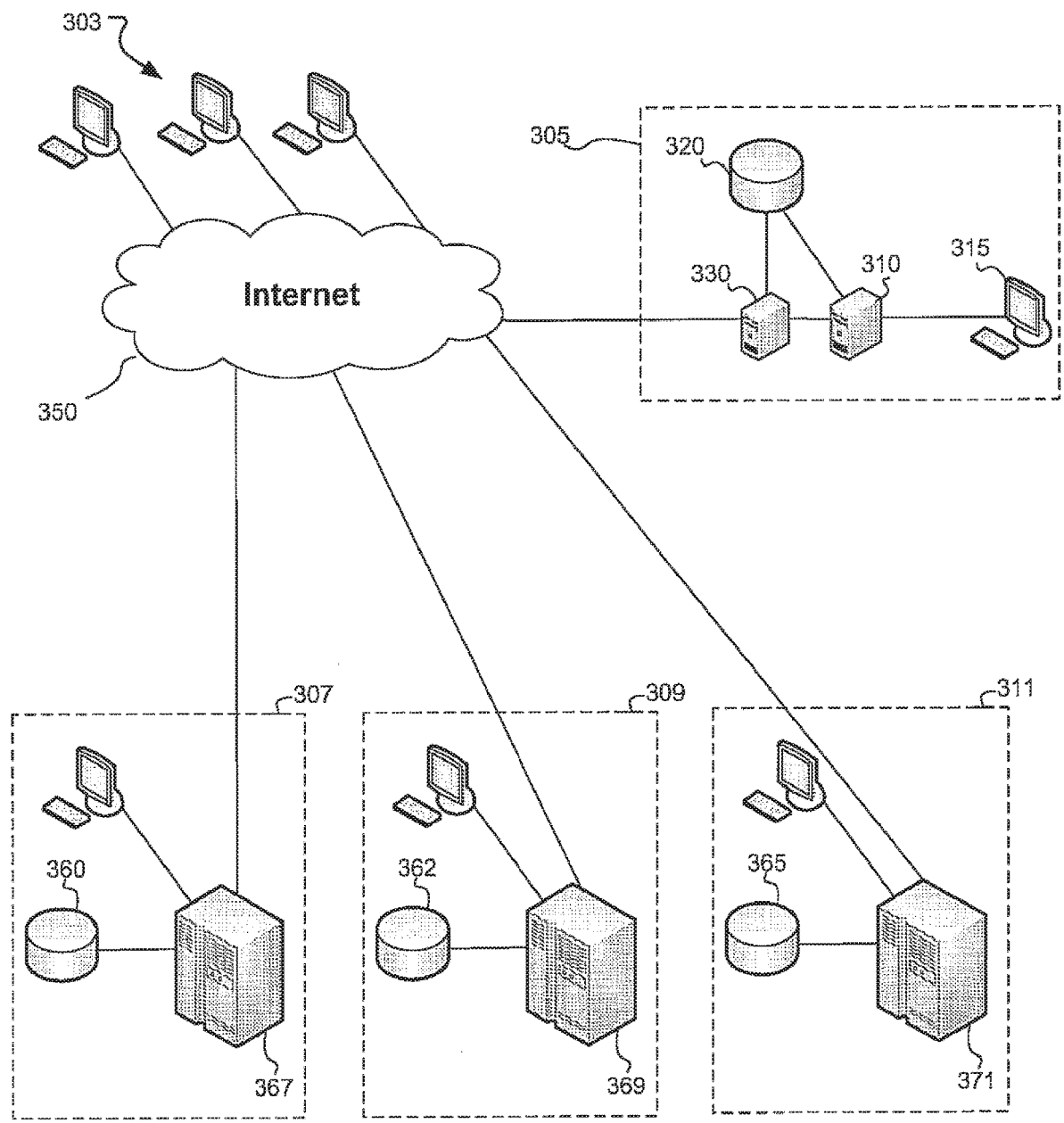
FIG. 3 shows a block diagram illustrating a system for practicing the methods of the disclosure.

FIG. 3 shows a block diagram of a system for carrying out the methods described above. A service provider 305 includes a web crawler 330 and a web server 310, which are accessed and controlled by one or more workstation computers 315. The web crawler 330 and the web server 310 both have access to a local database 320.

The web crawler 330 identifies and connects to a plurality of web servers 367, 369, 371 at data sources 307, 309, 311. The data sources 307, 309, 311 may be, e.g., government operated web sites. Each of the web servers 367, 369, 371 has access to a database 360, 362 and 365 wherein property records are stored. The web crawler queries the databases 360, 362, 365 via the web servers 367, 369, 371 to extract data and/or identify the URLs of the location of data or documents concerning particular properties. Of course, the data sources may be backend databases of governmental or non-governmental entities which are accessed directly by the system and not via a public-facing website. Such direct access can be provided by the database administrators, and such access may include access to fields and/or records in the database that are not accessible to the public via the public facing website.

In some embodiments, the system includes security measures to prevent hacking or other security concerns which may adversely affect a governmental authority or other data source. For example, firewall technologies can be utilized between the website or data source of the governmental authority and the system of the present disclosure.

While the present invention has been particularly shown and described with respect to certain embodiments thereof, it should be readily apparent to those of ordinary skill in the art that various changes and modification in form and details may be made without departing from the spirit of the invention and the scope of the appended claims. It is intended that the present invention cover modifications and variations of this invention within the scope of the appended claims and their equivalents. The invention described is not limited to the various examples and embodiments in this document, but rather, it is intended that the individual claims point out and claim the invention.

What is claimed is:

1. A method comprising:

using a local computer selectively coupled to a plurality of remote computers via a communications network, the plurality of remote computers having real property history data associated therewith, and having data sources associated therewith, an alternate remote computer having a data source associated therewith that is different from the data sources associated with each of said plurality of remote computers, the local computer being used to communicate with the plurality of remote computers over the communications network to build a database, wherein the real property history data includes any records of real property information available for identified properties from each identified data source;

storing a first identifier of a first data source of a first type of real property information in the database;

storing a different second identifier of a different second data source of a second type of real property information in the database;

performing automatically data layering of the data sources, wherein a data layering feature of a software automatically identifies a particular property with real property information from a plurality of governmental authorities, utilities, or public works;

generating a data source index associating a plurality of types of real property information with respective identifiers of a plurality of different data sources, the plurality of types of real property information including the first type of real property information and the second type of real property information, and the plurality of different data sources including the first data source and the second data source;

receiving a user input including an identifier of a selected property of interest to search the data sources;

retrieving from the first source and the second source, using the data source index and matching the identifier of the property, a plurality of records to populate a web interface with the plurality of records of the real property information of the property including the first type of real property information and the second type of real property information;

determining automatically a potential match for the property based on a predetermined threshold and prompting the user to confirm the match, wherein the matching process includes determining any discrepancies between how the property is described by different governmental authorities, utilities, or public works, and reconciling them;

overlaying, on a user interface, at least one of data layers of real property information, for the property from the plurality of remote computers, and display the layering of geographical information system (GIS) data on the user interface based upon user input to the user interface;

determining automatically that the retrieved real property information is incomplete, using business rules and based on the data source index including at least one type of real property information that is unavailable in the retrieved real property information of the property in the database;

flagging automatically the identifier of the property as incomplete in the database; and identifying the data source associated with the alternate remote computer to query to complete the real property information of the property and accessing the complete real property information including the records for the selected property.

2. The method of claim 1, wherein one of the first identifier and the second identifier is a URL.

3. The method of claim 1, wherein one of the first source and the second source is a public facing website.

4. The method of claim 1, wherein at least one of the first source and the second source is a backend database.

5. The method of claim 1, wherein none of the first source and the second source is a public facing website.

6. The method of claim 1, wherein the first source is a source of a third type of real property information, which is infrastructure information.

7. The method of claim 1, wherein the user input includes a click or selection of an area on a map.

8. The method of claim 1, wherein the user input includes an address.

9. The method of claim 1, wherein the user input includes a GPS position.

10. The method of claim 1, wherein the user input includes a tax parcel number.

11. The method of claim 1, wherein the user input includes a search.

12. The method of claim 1, wherein data layering of the data sources includes layering maps or layering at least one map and other data.

13. The method of claim 1, further comprising:

identifying the first identifier as identifying the first source; and identifying the second identifier as identifying the second source.

14. The method of claim 1, further comprising:

identifying a third identifier of a third source of the first type of real property information; and storing the third identifier in the database.

15. The method of claim 14, further comprising:

retrieving from the third source, using the data source index and based on the identifier of the property, real property information of the property including the first type of real property information.

16. The method of claim 1, further comprising:

identifying a third identifier of a third source of a third type of real property information; and storing the third identifier in the database.

17. The method of claim 16, further comprising:

retrieving from the third source, using the data source index and based on the identifier of the property, real property information of the property including the third type of real property information.

18. The method of claim 1, wherein the user interface displays a plan, drawing, or map of at least one selected property of interest.

19. The method of claim 1, wherein the first type of real property information is at least one of drawings, maps, and plans, or relates to at least one of design, engineering, construction, reconstruction, building, demolition, expansion, remodelling, alteration, sewer line, water line, flood control, canal, control line, power plant, electric power, fuel storage, natural gas, telephone, architecture, floor, ceiling, rooftop, site visibility, hazardous material, hazardous waste, airport, military facility, training facility, rail, road, site plan, parking and traffic data.

20. The method of claim 1, wherein the user input includes at least one of a tax parcel number, a metes and bounds description, GIS data, subdivision plat description, spatial data, a centroid, a cadastre, tabular data, attributes, and non-spatial data.

21. The method of claim 1, the user input includes a plurality of identifiers that result in potential matches for a plurality of properties.

22. The method of claim 1, further comprising storing classification data relating to real property information.

23. A system comprising:
    a plurality of remote computers having real property history data associated therewith and having data sources associated therewith;
    an alternate remote computer having a data source associated therewith that is different from the data sources associated with each of said plurality of remote computers;
    a local computer selectively coupled to said plurality of remote computers via a communications network, said local computer being configured to communicate with said plurality of remote computers over said communications network to build a database, wherein the real property history data includes any records of real property information available for identified properties from each identified data source;
    a memory including the database; and
    a processor, wherein the processor is configured to:
    store a first identifier of a first data source of a first type of real property information in the database;
    store a different second identifier of a different second data source of a second type of real property information in the database;
    perform automatically data layering of the data sources, wherein a data layering feature of a software automatically identifies a particular property with real property information from a plurality of governmental authorities, utilities, or public works;
    generate a data source index associating a plurality of types of real property information with respective identifiers of a plurality of different data sources, the plurality of types of real property information including the first type of real property information and the second type of real property information, and the plurality of different data sources including the first data source and the second data source;
    receive a user input including an identifier of a property of interest to search the data sources;
    retrieve from the first source and the second source, using the data source index and matching the identifier of the property, a plurality of records to populate a web interface with the plurality of records of the real property information of the property including the first type of real property information and the second type of real property information;
    determine automatically a potential match for the property based on a predetermined threshold and prompt the user to confirm the match, wherein the matching process includes determining any discrepancies between how the property is described by different governmental authorities, utilities, or public works, and reconciling them;
    overlay, on a user interface, at least one of data layers of real property information, for the property from the plurality of remote computers, and display the layering of geographical information system (GIS) data on the user interface based upon user input to the user interface;
    determine automatically that the retrieved real property information is incomplete, using business rules and based on the data source index including at least one type of real property information that is unavailable in the retrieved real property information of the property in the database;
    flag automatically the identifier of the property as incomplete in the database; and
    identify the data source associated with the alternate remote computer to query to complete the real property information of the property and access the complete real property information including the records for the selected property.

24. The system of claim 23, wherein at least one of the first source and the second source is a backend database.

25. The system of claim 23, wherein the system includes the first source and the second source.

26. The system of claim 23, wherein the system includes the user interface, which includes a display.

27. The method of claim 1, wherein the web interface is a web page.

28. The method of claim 1, wherein the user interface includes the web interface.

29. The method of claim 1, wherein the records of real property information include both permits and approvals.

30. The method of claim 1, wherein the records of real property information includes multiple different types of records, the different types comprising at least a plurality of types selected from the group consisting of permits, approvals, waivers, exceptions, exemptions, findings, determinations, hearings, official actions, amendments, certifications, orders, applications, maps, plans, and plats.

* * * * *